United States Patent [19]

Lafont

[11] 4,408,629

[45] Oct. 11, 1983

[54] VALVE MODIFICATION FOR FLUID PUMP VALVES

[75] Inventor: Larry J. Lafont, Lockport, La.

[73] Assignee: Conoco Inc., Ponca City, Okla.

[21] Appl. No.: 392,187

[22] Filed: Jun. 25, 1982

[51] Int. Cl.³ ............................................. F16K 43/00
[52] U.S. Cl. .......................... 137/329.04; 137/543.15; 251/334; 251/368; 251/DIG. 1; 277/177
[58] Field of Search ...................... 137/329.02, 329.03, 137/329.04, 540, 542, 543, 543.15; 251/334, 368, DIG. 1, 214; 277/177; 220/237

[56] References Cited

U.S. PATENT DOCUMENTS

| 767,118 | 8/1904 | Popham et al. | 137/329.04 |
| 874,652 | 12/1907 | Bailey | 251/DIG. 1 |
| 1,140,869 | 5/1915 | Birch | 137/329.02 |
| 1,405,968 | 2/1922 | Christman | 137/543.15 |
| 2,197,606 | 4/1940 | Birch | 137/543.15 |
| 3,588,040 | 6/1971 | Ward | 137/542 |
| 4,258,925 | 3/1981 | Guyton | 251/DIG. 1 |

FOREIGN PATENT DOCUMENTS 1288388 1/1969 Fed. Rep. of Germany ...... 251/334

Primary Examiner—George L. Walton
Attorney, Agent, or Firm—Stephen A. Littlefield

[57] ABSTRACT

Failure of a disc valve by abrasive wear caused by an abrasive fluid flowing through the valve is retarded by the provision of a resilient O-ring along the seating surface of the disc member. A second O-ring disposed within the central bore of the disc where it moves vertically along a shaft of the valve between its opened and closed positions avoids loss of sealing engagement with the shaft due to the wear of the disc due to friction and wobble on the shaft. Inexpensive polymeric discs incorporating such resilient O-rings have a service life which are at least comparable and in may cases in excess of the service life of more expensive stainless steel discs having a rubber coating thereon.

4 Claims, 4 Drawing Figures

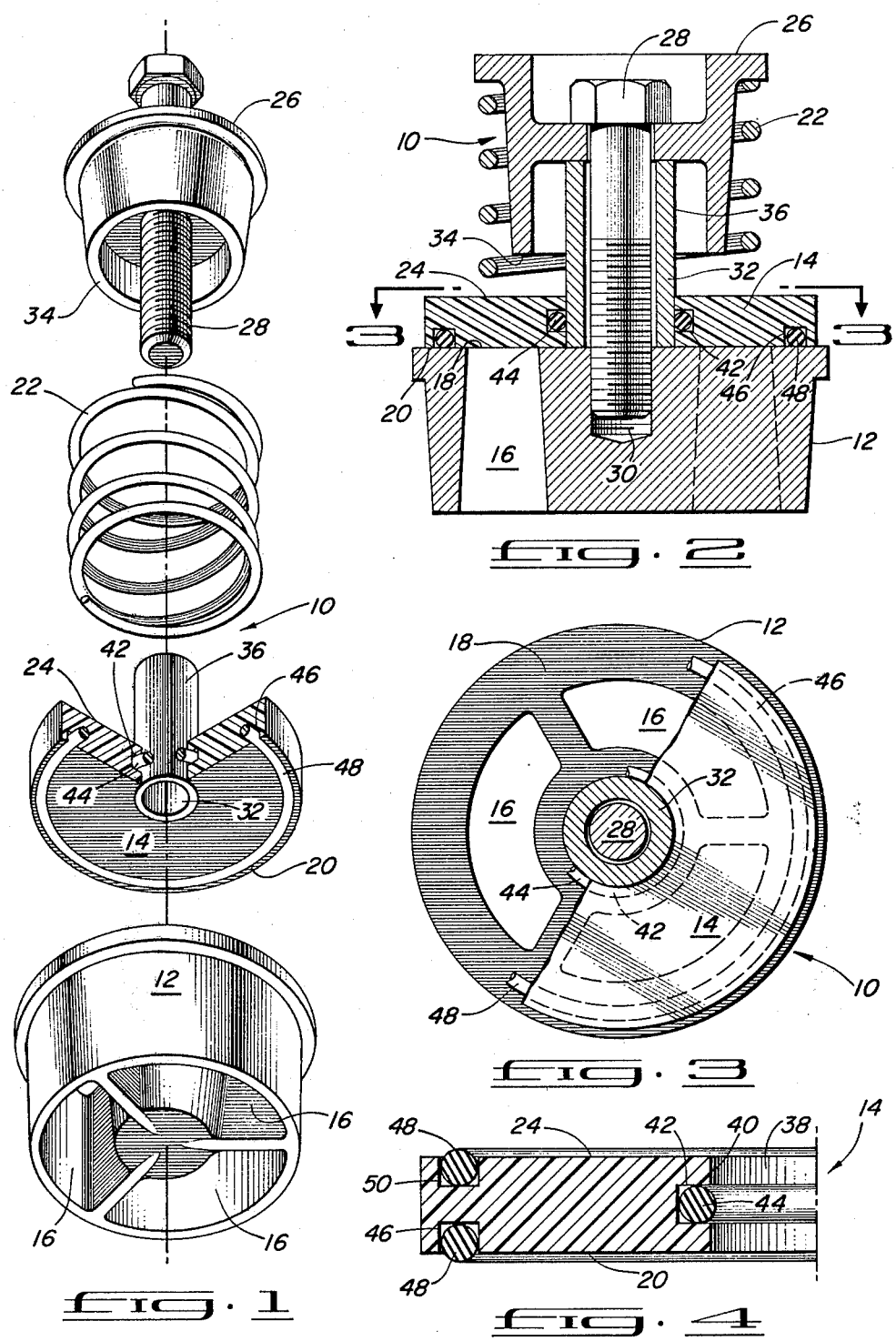

VALVE MODIFICATION FOR FLUID PUMP VALVES

This invention relates to the art of fluid pumps and more particularly to a check valve in a fluid pump which is subjected to wear by abrasive fluids flowing within the pump.

BACKGROUND OF THE INVENTION

The following shall constitute a prior art statement in accordance with the guidelines suggested in 37CFR Sections 1.56, 1.97 and 1.98.

Oil well fluids, such as those used in drilling or oil and water mixtures produced from wells, often contain large amounts of abrasives such as drilling mud solids, sand or ground rock. Such abrasives constitute a significant problem since oil well fluid handling mechanisms such as pumps and the like are subjected to extreme wear due to the presence of such abrasives in the fluids. Oil well fluid service pumps are particularly prone to extreme wear because the fluids containing abrasives pass through them in large volumes and at high flow rates. Surfaces such as valve closures within these pumps require frequent maintenance to retain adequate pumping efficiencies.

Common oil well fluid service pumps contain one or more check valves of the type in which fluid flow is interupted by a disc type closure which seats against a planar surface having one or more fluid flow passages therethrough. Since, in the open position of the valve, oil well fluids containing abrasives impinge directly on the seating face of the disc, wear on the seating face is a constant problem. In an effort to reduce maintenance of the discs of such valves, the discs are made of strong engineering thermoplastics which can withstand the heat and corrosiveness of an oil well fluid environment as well as endure the impingement of abrasives in the fluid while being relatively inexpensive. Acetal polymers such as those sold by DuPont under the trademark "DELRIN" are typical of the material provided for such use.

As an alternative to the use of high strength, engineering plastics, stainless steel discs covered with a resilient layer of rubber have been used which offer an extended service life but are significantly more expensive than acetal polymer discs.

Another major problem with the use of acetal polymer discs arises in applications where the disc is positioned on a shaft passing through the center of the disc with spring means provided to force the disc into seating engagement with the valve seat thereby closing the valve. When the valve is opened by the development of differential pressure sufficient to overcome the seating pressure of the valve spring, there can be a tilt or wobble induced in the valve disc due to any of several factors such as uneven flow through valve orifices and the like. Such wobble around the mounting shaft, particularly with regard to polymeric discs, results in extreme wear of the discs at the central opening through which the shaft passes. Loss of the pumping and valve efficiency through such failure is at least as common with this type of failure as with abrasive wear of the seating surfaces of the valve disc. Such wear is present, though to a lesser degree, on rubber-coated stainless steel valve disc closures.

SUMMARY OF THE INVENTION

The present invention provides an inexpensive solution to the problem of high wear rates which affect pumping efficiencies in oil well fluid service pumps. The invention provides an inexpensive alternative to constant maintenance of polymeric discs and/or the use of expensive, rubber-coated stainless steel discs.

In accordance with the invention, a valve for controlling the flow of an abrasive fluid wherein the valve comprises a valve body having a seating surface and at least one fluid passage extending through the valve body to the seating surface and a disc-form closure having a planar face which engages the seating surface of the valve body is modified by the provision of an annular groove disposed in the planar surface of the valve disc and a resilient, circular sealing member disposed within the groove. The disc has a central cylindrical opening so as to interfit with a shaft extending from the valve body so that the disc may move generally perpendicularly toward and away from the seating surface of the valve body. Spring means are provided for biasing the planar surface of the disc into compressive abutment against the seating surface. A second groove is provided in the cylindrical wall of the disc adjacent the shaft and a second resilient sealing member is interposed within this second groove in contact with the shaft.

Further, in accordance with the invention, the aforementioned valve disc is formed of an acetal polymer.

It is therefore an object of this invention to provide an inexpensive valve disc which incorporates a resilient seal to extend the wear life of the valve disc by providing a sealing member on its planar sealing face.

It is a further object of this invention to provide a valve disc which incorporates a sealing member along its central mounting shaft so that failure due to wobbling or tilting of the disc because of uneven flow pressure against the disc is avoided.

BRIEF DESCRIPTION OF THE DRAWING

These and other objects of the invention are accomplished through the manner and form of the present invention to be described in greater detail as a preferred embodiment thereof which is illustrated in the accompanying drawings forming a part of this specification and in which:

FIG. 1 is an exploded, isometric view of a valve employing the preferred modified valve disc of this invention;

FIG. 2 is a cross-sectional, side elevational view of the valve shown in FIG. 1;

FIG. 3 is a fragmented, top plan view of the valve shown in FIG. 2 taken along line 3—3 thereof, and FIG. 4 is partial sectional view of a modified form of the valve disc used in the valve illustrated in FIG. 1 in accordance with another embodiment of this invention.

DETAILED DESCRIPTION OF THE PREFERRED EMBODIMENTS AND THE DRAWINGS

Referring now to the drawing wherein the showings are for the purposes of illustrating a preferred embodiment of the invention only and not for the purpose of limiting same, FIGS. 1-3 show a fluid flow check valve 10 having a valve body 12 and a closure disc 14. The valve 10 is typical of a pump valve such as that used in a plunger pump sold by Oilwell, Inc. under the designation A346 Triplex. It will be understood that this invention is not limited to specific use in only this particular valve in this pump or type of pumps but may be used generally in any application wherein a valve utilizes a disc type closure such as that illustrated in the figures.

The valve body 12 has a plurality of fluid passageways 16 which permit the flow of fluid through the valve when the disc member 14 is disposed away from the seating surface 18 of the valve body 12 in the open position. The sealing surface 20 of the disc member 14 is in compressive abutment against the seating surface 18 of the valve body 12 when the valve is in the closed position illustrated in FIG. 2. The closed position of the valve is maintained by a spring 22 acting against the top face 24 of the disc member 14 and against a valve guard 26 which is attached to the valve body 12 by a threaded machine screw 28. The machine screw 28 extends into a threaded hole 30 in the valve body 12 through a cylindrical shaft 32 which acts to locate the valve guard 26 and particularly the circular bottom surface 34 thereof at a position spaced away from the valve body 12. The circular bottom surface 34 of the valve guard 26 engages the top face 24 of the disc member 14 thereby acting to limit the upward movement of the disc member 14 in the open position. The outer surface 36 of the cylindrical shaft 32 passes through the central opening 38 (FIG. 4) of the disc member 14, the shaft 32 acting to locate the disc member 14 centrally of the valve body 12 thereby limiting any side to side movement of the disc member 14.

In accordance with one aspect of the invention, the cylindrical opening 38 having a cylindrical side wall 40 includes an annular groove 42 cut radially outwardly in the cylindrical side wall 40. It will be understood that while the annular groove 42 is shown as having a generally rectangular cross-section, other cross sectional shapes such as circular, dovetail, etc. may be provided within the scope of this invention. A resilient shaft sealing ring 44 is disposed within the annular groove 42 and compressed against the outer surface 36 of the cylindrical shaft 32. With the provision of the resilient shaft sealing ring 44, failure of the valve 10 due to wear on the cylindrical wall 40 of the disc member 14 due to wobble or tilting of the disc along and against the cylindrical shaft 32 is greatly retarded.

Failure of the valve 10 is also a problem when sealing engagement between the sealing surface 20 of the disc member 14 and the seating surface 18 of the valve body 12 is lost through abrasive wear of the sealing surface 20 by impingement of the abrasive particles flowing through the fluid passageway 16 when the valve is in the open position. In order to reduce the effects of this wear and provide for sealing of the valve disc 14 against the valve body 12 in spite of such wear, an annular groove 46 is provided on the outward periphery of the sealing surface 20 of the disc member 14. A resilient, circular O-ring 48 is disposed within the annular groove 46 so that, when the valve 10 is in the closed position, the resilient O-ring 48 is compressed into sealing engagement against the seating surface 18 of the valve body 12.

The disc member 14 is made of any material which is appropriate for the corrosive and abrasive environment common in a well fluid service pump. Such fluids can commonly include oil, entrained gas, water, acids, alkalis and abrasive particles such as sand, crushed rock and drilling mud solids. Valves incorporating such discs are commonly employed in pumps having discharge pressures ranging from 300 to 450 psi and fluid flow volumes of from 600 to 6000 barrels per day at temperatures upwards of 120° F. As previously stated, one type of valve disc material to perform adequately in such a hostile environment comprises a disc of acetal polymer such as that sold by DuPont under the trademark "DELRIN".

Resilient sealing rings 44 and 48 must be of material which will retain its resiliency in the same environment as described above. Although it will be understood that any ring constructed of a material capable of service use in the afore-mentioned environment may be employed, it has been found that O-Rings supplied by Parker-Hannifin, of Cleveland, Ohio, formed of their N-90 and/or N-674 compounds may be usefully employed in this invention.

With the modifications of the present invention, acetal polymer discs have been found to last at least as long as rubber-bonded stainless steel discs which cost about three times as much. Without the modifications of this invention, an acetal polymer disc would last only about one-fourth as long as a disc modified in accordance with this invention.

The service life of an acetal polymer disc can be even further extended by the modification shown in FIG. 4. In this embodiment, a second annular groove 50 is provided in the top face 24 of the disc member 14 similar to the annular groove 46 in the sealing surface 20 thereof. A second O-ring 48 is provided in this second annular groove 50. With the provision of this second annular groove 50 and its associated O-ring 48, the disc member 14 may be inverted so that its top face 24 becomes the seating surface and the O-ring 48 disposed within the second annular groove 50 seats against the seating surface 18 of the valve body 12 when the valve 10 is in its closed position. In the process of inverting the disc member 14, it is possible and preferable to replace the shaft sealing ring 44 within the annular groove 42. With these additional modifications, the service life of the disc member 14 may be even further extended.

From the foregoing, it can be clearly seen that the present invention provides an inexpensive solution to the problem of high wear rates which affect pumping efficiencies in oil well fluid service pumps. The invention provides an inexpensive alternative to constant maintainence of polymeric discs and/or the use of expensive, rubber-coated stainless steel discs.

It has been shown that in accordance with the invention, a valve 10 for controlling the flow of an abrasive fluid wherein the valve comprises a valve body 12 having a seating surface 18 and at least one fluid passage 16 extending through the valve body 12 to the seating surface 18 and a disc-form closure member 14 having a planar sealing surface 20 which engages the seating surface 18 of the valve body 12 is modified by the provision of at least one annular groove 46 disposed in the planar sealing surface 20 of the valve disc member 14 and a resilient, circular sealing member 48 is provided within the annular groove 46. The disc member 14 has a central cylindrical opening 38 so that the disc member 14 may move generally perpendicularly toward and away from the seating surface 18 of the valve body 12. Spring means 22 are provided for biasing the planar sealing surface 20 of the disc member 14 into compressive abutment against the seating surface 18. A second annular groove 42 is provided in the cylindrical wall 40 of the disc member 14 adjacent the shaft 32 and a second resilient sealing member 44 is interposed within this second groove 42 in contact with the shaft 32.

While the invention has been described in the more limited aspects of the preferred embodiment thereof, other embodiments have been suggested and still others will occur to those skilled in the art upon the reading and understanding of the foregoing specification. It is intended that all such embodiments be included within the scope of the invention as limited only by the appended claims.

Having thus described my invention, I claim:

1. In a valve for controlling the flow of an abrasive fluid, said valve having a valve body with a seating surface; a fluid passage extending through said valve body to said seating surface; valve closure means comprising a planar polymeric disc having a primary planar sealing surface adapted for engagement with said seating surface and further including spring means for biasing said primary planar sealing surface of said disc into compressive engagement with said valve seating surface, said disc and spring means being mounted concentrically on a central shaft passing through a central opening having a cylindrical side wall in said disc and secured within said valve body, the improvement which comprises; a first annular groove disposed in said primary planar sealing surface of said disc so as to engage said seating surface radially outwardly of said fluid passage, said first annular groove including a secondary sealing surface having a first resilient circular sealing member disposed therein and a second annular groove including a third sealing surface disposed in said cylindrical side wall of said opening of said disc having a second resilient circular sealing member disposed therein, said second resilient circular sealing member being in compressive engagement around said shaft whereby flow of said abrasive fluid is controlled after erosion of said disc by said first and second resilient circular sealing members.

2. The improvement as set forth in claim 1 wherein said polymeric disc comprises an acetal polymer.

3. The improvement as set forth in claim 2 wherein said first and second resilient sealing members comprise O-rings.

4. The improvement as set forth in claim 1 wherein said disc includes a planar upper surface and a third annular groove disposed therein corresponding to said first annular groove in said primary planar sealing surface and having a third resilient circular sealing member disposed therein, said disc being reversible on said shaft.

* * * * *